United States Patent
Ohmori et al.

(10) Patent No.: US 6,479,031 B2
(45) Date of Patent: Nov. 12, 2002

(54) PARTICLES, AQUEOUS DISPERSION AND FILM OF TITANIUM OXIDE, AND PREPARATION THEREOF

(75) Inventors: Masahiro Ohmori, Ichihara (JP); Tadashi Hamanaka, Ichihara (JP); Hidenori Nakamura, Kawasaki (JP)

(73) Assignee: Showa Denko KK, Tokyo (JP)

( * ) Notice: Subject to any disclaimer, the term of this patent is extended or adjusted under 35 U.S.C. 154(b) by 0 days.

(21) Appl. No.: 09/983,447

(22) Filed: Oct. 24, 2001

(65) Prior Publication Data

US 2002/0042449 A1 Apr. 11, 2002

Related U.S. Application Data

(63) Continuation of application No. 08/921,343, filed on Aug. 29, 1997, now Pat. No. 6,340,711.

(30) Foreign Application Priority Data

Aug. 30, 1996 (JP) .............................................. 8-230776
May 27, 1997 (JP) .............................................. 9-137192

(51) Int. Cl.[7] ........................................... C01G 23/047
(52) U.S. Cl. .................. 423/610; 502/350; 106/287.19; 106/436; 516/79
(58) Field of Search ................................. 423/610, 612; 502/350, 227; 106/446, 287.14, 287.19, 436; 516/79

(56) References Cited

U.S. PATENT DOCUMENTS

| | | | | |
|---|---|---|---|---|
| 2,406,465 A | * | 8/1946 | Keats ........................... | 106/436 |
| 3,329,484 A | | 7/1967 | Long et al. ................... | 423/612 |
| 3,338,677 A | | 8/1967 | Berry ............................ | 423/610 |
| 3,703,357 A | * | 11/1972 | Surls et al. ................... | 106/436 |
| 3,749,764 A | | 7/1973 | Basque et al. ................ | 106/436 |
| 3,923,968 A | | 12/1975 | Basque et al. ................ | 106/436 |
| 4,668,501 A | | 5/1987 | Shibuta et al. ............... | 423/609 |
| 5,049,309 A | | 9/1991 | Sakamoto et al. ............ | 423/610 |
| 5,468,463 A | | 11/1995 | Buetje et al. ................. | 423/612 |
| 5,686,372 A | | 11/1997 | Langford et al. ............. | 502/242 |
| 5,776,239 A | | 7/1998 | Bruno ........................... | 106/436 |
| 5,821,186 A | | 10/1998 | Collins ............................. | 502/8 |
| 5,897,958 A | | 4/1999 | Yamada et al. .............. | 502/350 |

FOREIGN PATENT DOCUMENTS

| | | | |
|---|---|---|---|
| DE | 2251925 | | 4/1973 |
| JP | 48-67196 | * | 9/1973 |
| JP | 6397234 | | 4/1988 |
| JP | 63162549 | | 7/1988 |
| JP | 5253544 | | 10/1993 |
| JP | 9217028 | | 8/1997 |

OTHER PUBLICATIONS

Derwent Database on EAST, week 197423, London: Derwent Publications Ltd., AN 1974–42247V, Class E32, JP 48–67196 A, (Seisan Kagaku Kenkyujo) abstract.*

(List continued on next page.)

Primary Examiner—Daniel S. Metzmaier
(74) Attorney, Agent, or Firm—Sughrue Mion, PLLC

(57) ABSTRACT

An aqueous titanium oxide-dispersed sol comprising titanium oxide particles dispersed in water, said sol comprising chloride ions in an amount of 50 to 10,000 ppm by weight as the chlorine element. Titanium tetrachloride is hydrolyzed to form an aqueous titanium oxide-dispersed sol and the chloride ion concentration thereof is controlled. Another aqueous titanium oxide-dispersed sol comprising brookite-type titanium oxide particles dispersed in water, said titanium oxide particles having an average particle size of not more than 0.5 $\mu$m and a specific surface area of not less than 20 $m^2/g$. Addition of titanium tetrachloride to hot water at 75 to 100° C. followed by hydrolysis at 75° C. to the boiling point of the mixture.

5 Claims, 1 Drawing Sheet

OTHER PUBLICATIONS

Kogyo Kagaku Zasshi, vol. 59, No. 11, pp. 65–67, "Study on Properties of $TiO_2$ formed by Hydrolysis of $TiCl_4$.", (1956, month unknown).

Chemical Mater., vol. 7, p. 663–671. "Hydrothermal Preparation of Uniform Nanosize Rutile and Anatase Particles.", Cheng et al., (1995, month unknown).

Journal of Colloid and Interfaced Science, vol. 111, No. 1, May 1996, p. 44–53. "Kinetics of Titanium Dioxide Precipitation by Thermal Hydrolysis.", Santacesaria et al.

Journal of Americain Society, vol. 118, p. 6716–6723, "Electrochemical and Photoelectrochemical Investigation of Single–Crystal Anatase." Kavan et al., (1996, month unknown).

Formation of Titanic Oxides of Anatase, brookite and Rutile Types by Aerial oxidation of Titanous Solutions, Chemistry Letters, pp. 21–24, Kiyama et al., (1972, month unknown).

Microstructure of nanosized $TiO_2$ obtained by sol–gel synthesis, Material Letters, vol. 28, Sep. 1996, pp. 225–229, Gotie et al.

Chemical Abstracts, vol. 86, No. 6, Feb. 7, 1997, 86:3:045y, Production of titanium seed crystals from titanium tetrachloride.

Arnal et al., "Preparation of anatase, brookite and rutile at low temperature by non–hydrolytic sol–gel methods", J. of Materials Chemistry, vol. 6, No. 12, pp. 1925–1932, (Dec. 1996).

Suwa et al., "Polymorphic transformation of titanium dioxide by mechanical grinding", Journal of materials Science, (May 1984) vol. 19, No. 5, 1397–1405.

* cited by examiner

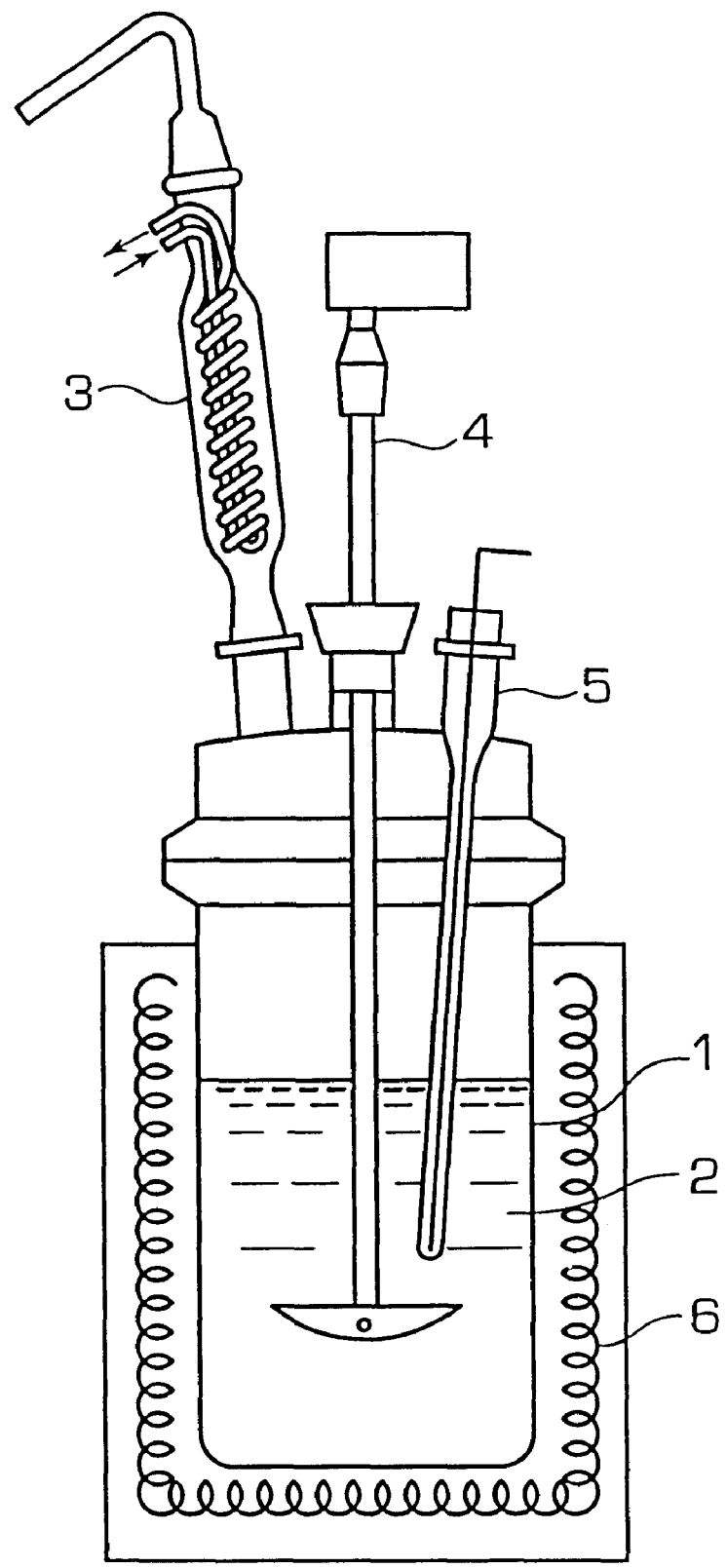

PARTICLES, AQUEOUS DISPERSION AND FILM OF TITANIUM OXIDE, AND PREPARATION THEREOF

This is a continuation of Application Ser. No. 08/921,343 filed Aug. 29, 1997, now U.S. Pat. No. 6,340,711, the disclosure of which is incorporated herein by reference.

BACKGROUND OF THE INVENTION

1. Field of the Invention

The present invention relates to an aqueous titanium oxide-dispersed sol, a titanium oxide film formed on a substrate of a ceramic, a synthetic resin or the like from said sol, specific titanium oxide particles, and a process for preparing an aqueous titanium oxide-dispersed sol. The titanium oxide film of the present invention is transparent and is excellent in photocatalytic activity and adhesion to a substrate.

2. Description of the Related Art

It is known that titanium dioxide (hereinafter simply referred to as "titanium oxide") has three crystal phases, the anatase, the brookite and the rutile type. When titanium oxide is formed by combustion of titanium tetrachloride with oxygen in a vapor phase deposition process, anatase-type titanium oxide is formed and is stable at the lowest temperature. When the thus formed anatase-type titanium oxide is heat treated and the temperature is raised, brookite-type titanium oxide is formed at a temperature of 816 to 1040° C. and rutile-type titanium oxide is formed at a temperature higher than 1040° C.

Concerning a liquid process, the crystal phases of titanium oxide formed by hydrolysis of titanium tetrachloride are reported in detail by Kouemon Funaki in "Kogyo Kagaku (Industrial Chemistry)" Vol. 59, No. 11, p1295. This report concluded that rutile-type titanium oxide is formed mainly from a high concentration solution and anatase-type titanium oxide is formed from a low concentration solution. It was reported that formation of fine brookite-type titanium oxide particles in an liquid phase process was impossible.

As seen from the above, it was difficult to stably produce brookite-type titanium oxide in a liquid phase process. If the titanium oxide formed in a heated process is further heat treated at a high temperature, brookite-type titanium oxide may be obtained but the obtained titanium oxide particles have been grown by the heat treatment. Therefore, it was difficult to obtain fine brookite-type titanium oxide crystal particles.

As for the process for forming a titanium oxide sol, it is generally true that crystalline or amorphous titanium oxide particles are dispersed in a dispersing medium, or a titanium oxide precursor such as methane alkoxide, titanium sulfate or titanium tetrachloride is mixed into a dispersing medium, followed by neutralization or hydrolysis of the precursor, to form a titanium oxide sol.

A titanium oxide sol is used for producing titanium oxide particles or for forming a titanium oxide film by coating the sol on a glass or ceramic.

It is known that a titanium oxide sol is a photosemiconductor and has a transparency and an increased photocatalytic activity when its particle size is small. The photocatalytic activity of titanium oxide has recently been investigated throughly. The applications of the photocatalytic activity include removing harmful materials for cleaning, removing odor such as ammonia for deodorization, and sterilization of microorganisms. Titanium oxide is used in various forms such as a bulk, particles, a film and a sol, depending on the types of the applications. When the photocatalytic activity is to be combined with the transparency, the titanium oxide is often formed as a film. Accordingly, the titanium oxide is often used in the form of a sol for forming a film.

It is recognized that the photocatalytic activity of titanium oxide is higher in the rutile-type than in the anatase-type. The reason is a difference of energy gap of about 0.2 eV between the two types, as the energy gap of the rutile-type is 3.02 eV and that of the anatase is 3.23 eV (see Ceramics 31 (1996), No. 10, p817). Because of this energy gap, the anatase-type titanium oxide is preferably used as a photo-semiconductor.

As of the brookite-type titanium oxide, a pure material of brookite-type titanium oxide has not been obtained, and it was difficult to obtain fine particles of brookite-type titanium oxide having such a high specific surface area that they can be used as a photosemiconductor since the particles of brookite-type titanium oxide are prepared at such a high temperature that they are sintered.

It has been proposed that when a titanium oxide film is formed on an illuminator, for example, a glass tube of a fluorescent lump or a cover thereof, by coating it with a titanium oxide sol, organic materials such as oil smoke, when adhered thereto, are decomposed by the photocatalytic activity of the titanium oxide.

However, the sols produced by the processes described before rarely provide a titanium oxide film having a high transparency and an illuminator having a brookite-type titanium oxide film as the photocatalyst has not been known.

When a titanium oxide film is used as the photocatalyst by forming it on a glass, plastic or other substrate, it is required that the titanium oxide film has a high photocatalytic activity. Since the photocatalyst action is a reaction on the surface of particles, the particles should be fine particles having a high specific surface area and have an excellent crystillinity to obtain a high photocatalytic activity. It is also required that the film is transparent when the film is applied to an illuminator, To improve the transparency, it is desired that the particles are fine and monodispersed, as in the case of improving photocatalytic activity. Conventionally, the anatase-type titanium oxide is used and is made fine to solve the above problems.

It is also required that the titanium oxide film have a high adhesivity and peeling of the titanium oxide film should be prevented when it is formed on a substrate.

In the conventional process of hydrolyzing titanium tetrachloride, it was difficult to obtain a titanium oxide sol having a very small particle size and an excellent crystallinity of the titanium oxide particles in the sol and providing a high transparency when formed into a film.

In the process of hydrolyzing titanium alkoxide, the particles of the obtained titanium oxide sol are excellent in powder characteristics including very fine particle size, but the sol includes alcohol, which involves a safety problem that explosion may be caused when the sol is heated to form a titanium film. To prevent the explosion, a large scale apparatus for preventing the explosion is required and it is economically disadvantageous. Further, titanium alkoxide is much more expensive than titanium tetrachloride.

The object of the present invention is to provide a titanium oxide sol which can provide, on a substrate, a titanium oxide film excellent in photocatalytic activity and transparency as well as adhesion to the substrate, and to provide fine brookite-type titanium oxide particles.

SUMMARY OF THE INVENTION

As the result of investigation into titanium oxide films formed from titanium oxide sols, the present inventors have found that chloride ions contained in a titanium oxide sol contribute to the transparency and adhesivity to the substrate of the titanium oxide film; a titanium oxide sol having a certain concentration of chloride ions provides a titanium oxide film having improved transparency and adhesivity; and the brookite-type titanium oxide with a large energy gap is particularly excellent in the photocatalytic activity.

In accordance with the present invention, the following is provided.

(1) An aqueous titanium oxide-dispersed sol comprising titanium oxide particles dispersed in water, said sol comprising chloride ions in an amount of 50 to 10,000 ppm by weight as the chlorine element.

(2) An aqueous titanium oxide-dispersed sol comprising brookite-type titanium oxide particles dispersed in water, said titanium oxide particles having an average particle size of not more than 0.5 $\mu$m and a specific surface area of not less than 20 $m^2/g$.

(3) Brookite-type titanium oxide particles having an average particle size of not more than 0.5 $\mu$m and a specific surface area of not less than 20 $m^2/g$.

(4) A titanium oxide film which is formed on a substrate using the aqueous titanium oxide-dispersed sol as set forth in the above (1) or (2).

(5) A process for preparing an aqueous titanium oxide-dispersed sol, comprising the steps of:

forming an aqueous titanium oxide-dispersed sol by hydrolysis of titanium tetrachloride, and controlling an amount of chloride ions in said aqueous titanium oxide-dispersed sol to 50 to 10,000 ppm by weight as the chlorine element.

(6) A process for preparing an aqueous titanium oxide-dispersed sol, comprising the steps of:

adding titanium tetrachloride to hot water at a temperature of 75 to 100° C., and hydrolyzing the titanium tetrachloride at a temperature in a range of 75° C. to a boiling point of the solution or sol, to form an aqueous sol of brookite-type titanium oxide particles.

(7) A process for preparing brookite-type titanium oxide particles, in which the aqueous sol of brookite-type titanium oxide particles of the above (6) is filtered and dried.

BRIEF DESCRIPTION OF THE DRAWING

The Figure shows a reactor equipped with a reflux cooler, which used for producing a titanium oxide sol in an example of the present invention.

DESCRIPTIONS OF THE PREFERRED EMBODIMENTS

A first aqueous titanium oxide-dispersed sol of the present invention is a sol which provides a titanium oxide film having not only excellent photocatalytic activity but also increased adhesion to a substrate and transparency, and is characterized by containing chloride ions in an amount of 50 to 10,000 ppm, preferably 100 to 4,000 ppm as the chlorine element.

In the process of hydrolyzing titanium chloride to obtain an aqueous titanium oxide-dispersed sol, hydrogen chloride is formed by the reaction. The hydrogen chloride is almost dissociated to chloride ion and hydrogen ion in the sol. In general, the hydrogen chloride escapes from the reaction system during the hydrolysis under heating. Further, when hydrogen chloride in the sol increases to a certain level in the hydrolysis, dechlorination treatment is usually carried out on the sol to remove hydrogen chloride, since if the sol contains hydrogen chloride, various problems occur in obtaining titanium oxide particles or a titanium oxide film from the sol. The relationship between the chloride ions in the sol and the characteristics of the titanium oxide film have not been considered in the prior art and there is no technology which controls the chloride ions in the sol from this viewpoint.

If the chloride ions contained in the aqueous titanium oxide-dispersed sol are in an amount of less than 50 ppm as the chlorine element, the titanium oxide film formed on a substrate from the sol has poor adhesion to the substrate. Particularly when the titanium oxide film is heat treated, a difference in the adhesion of the film to the substrate, depending on whether or not the chloride ions are contained in an amount of not less than 50 ppm, appears. In the present invention, the adhesion of the film to a substrate is represented by the peeling force of the film from the substrate and the hardness of the film. On the other hand, if the amount of the chloride ions in the sol increases to more than 10,000 ppm as the chlorine element, the transparency of the film is reduced. A preferable range is 100 to 4,000 ppm.

The action of the chloride ions is not clear, but it is supposed that as the electrical repulsion between titanium oxide particles increases in the titanium oxide sol, the dispersibility of the particles is improved so that the transparency and peeling strength of the film are improved.

As the titanium oxide particles in the aqueous titanium oxide-dispersed sol are finer, the photocatalytic activity and the transparency of the titanium oxide film are improved. It is preferable from the photocatalytic activity that the titanium oxide particles are crystalline. However, if the particle size of the titanium oxide particles is too small, such particles are difficult to produce. Accordingly, an average particle size of titanium oxide particles in a sol is preferably in a range of 0.01 to 0.1 $\mu$m.

A second aqueous titanium oxide-dispersed sol of the present invention is a sol which provides a titanium oxide film having improved photocatalytic activity and transparency and is characterized in that the titanium oxide particles dispersed in water are brookite-type titanium oxide particles having an average particle size of not more than 0.5 $\mu$m, preferably 0.01 to 0.1 $\mu$m and a specific surface area of not less than 20 $m^2/g$. The brookite-type titanium oxide particles have an energy gap of 3.23 eV or more.

As to the particle size of the titanium oxide particles, it is preferable for the transparency that the titanium oxide particles are monodispersant with an average particle size of not more than 0.5 $\mu$m, preferably 0.01 to 0.1 $\mu$m. Even if the specific surface area of the particles is large, agglomerates of primary particles do not provide a transparent film of titanium oxide.

In the prior art, the brookite-type titanium oxide cannot be produced except by a process in which anatase-type titanium oxide is heat treated. If the brookite-type titanium oxide is produced by the heat treatment, the brookite-type titanium oxide particles are grown to a large particle Size by the heat treatment, which therefore has not been used to form a titanium oxide film.

In a sol in which the above brookite-type titanium oxide particles are dispersed in water, the chloride ions may be contained in an amount of 50 to 10,000 ppm as the chlorine element, by which the titanium oxide film formed from the sol can be excellent not only in photocatalytic activity but also in adhesion to a substrate.

In the above first and second aqueous titanium oxide-dispersed sols of the present invention, if the concentration of the titanium oxide particles is too high, the particles agglomerate and the sol becomes unstable. If the concentration of the titanium oxide particles is too low, there are often problems. For example, the step of forming a titanium oxide film by coating takes a long time. Therefore, the concentration of the titanium oxide particles is appropriate in a range of 0.05 to 10 mol/l.

By filtering, washing and drying the aqueous titanium oxide-dispersed sol of the present invention, titanium oxide particles can be obtained. The brookite-type titanium oxide particles thus obtained have an average particle size of not more than 0.5 $\mu$m, preferably 0.01 to 0.1 $\mu$m and a specific surface area of not less than 20 $m^2/g$. They have an energy gap of 3.23 eV or more.

When the aqueous titanium oxide-dispersed sol is used to form a titanium oxide film, it is preferred that a water-soluble polymer is added in a small amount, for example, about 10 to 10,000 ppm, to improve the film-forming capability or coatability thereof. Preferable water-soluble polymers include polyvinylalcohol, methylcellulose, ethylecellulose, CMC, starch, etc.

The aqueous titanium oxide-dispersed sol of the present invention can be coated on a substrate of various materials to form a titanium oxide film on the surface of the substrate. The substrate is not limited and may be ceramic, metal, plastic, wood, paper, etc.

The substrate may be a catalyst carrier of alumina, zirconia, etc. on which the titanium oxide film be provided as a catalyst, by which a catalyst is produced. Also, the substrate may be a glass tube or a plastic cover of an illuminator such as a fluorescent lamp, on which the titanium oxide film can be formed. This titanium oxide film is transparent and has a photocatalytic activity, so that the film can decompose organic materials such as oil smoke without shielding the light, which is therefore useful to prevent dirt of a glass tube or a plastic cover. If such a titanium oxide film is formed on a window pane or wall of a building, dirt on the pane or wall can be also prevented. If the film is provided on a window pane or wall of a tall building, the necessity of cleaning can be removed or reduced so that it is useful to reduce cost for maintenance of the building.

The methods for applying an aqueous titanium oxide-dispersed sol to a substrate include immersion of a substrate in a sol, spraying a sol onto a substrate, brush coating a sol on a substrate, and so on. The thickness of the applied sol is appropriately 0.01 to 0.2 m. After the application of the sol to a substrate, the water content of the sol is removed by drying to obtain a titanium oxide film. This film may be used as a catalyst, etc., as mentioned above.

When the substrate is of a heat resistant material, for example, glass, the titanium oxide film formed on the substrate may be heat treated. By this heat treatment, the film may be adhered to the substrate more strongly and have a higher hardness. The temperature of heat treatment is preferably not less than 200° C. The upper limit of the heat treatment is not particularly set and can be determined based on the heat resistance of the substrate. However, the hardness and the adhesive force to the substrate of the film do not increase even if the temperature is very high. Therefore, a temperature up to about 800° C. is appropriate. In the case of brookite-type titanium oxide, a temperature of not higher than 700° C. is appropriate to maintain the crystal phase of brookite-type titanium oxide.

Alternatively, the adhesive force of the transparent titanium oxide film to the substrate can be increased without heat treatment, by adding an appropriate adhesive to an aqueous titanium oxide-dispersed sol of the present invention. An appropriate adhesive includes an organic silica-containing compound such as alkylsilicate. The amount of the adhesive may be in an amount (as $SiO_2$) of 1 to 50% by weight of the titanium oxide of the titanium oxide sol. If the amount of the adhesive is less than 1% by weight, the desired effect cannot be obtained. If the amount of the adhesive is more than 50% by weight, a very high adhesion can be obtained but the photocatalytic activity of the film is lost as the titanium oxide particles are covered by the adhesive, which is not preferable. The adhesive may be added to the sol just prior to use (application or coating) or may be previously added when the sol is prepared, considering the nature of the adhesive.

The atmosphere of the heat treatment is not particularly limited and may be air. The time for the heat treatment is not particularly limited and may be, for example, 1 to 60 minutes. The titanium oxide film obtained after the heat treatment is about 0.05 to 1.0 $\mu$m in thickness when the sol is applied in an amount as mentioned above.

The preparation of the aqueous titanium oxide-dispersed sol of the present invention is described below.

The process for preparing the first aqueous titanium oxide-dispersed sol of the present invention is not particularly limited as long as the prepared sol contains chloride ions in the above-mentioned amount. For example, titanium alkoxide can be hydrolyzed to form an aqueous titanium oxide-dispersed sol containing a small amount of alcohol, to which HCl or the like be added to control the chloride ion to the above-mentioned concentration. However, it is preferred that titanium tetrachloride which forms hydrogen chloride by hydrolysis is used.

The second aqueous titanium oxide-dispersed sol of the present invention is obtained by hydrolyzing titanium tetrachloride under certain conditions.

It is preferred that hydrogen chloride produced by the above hydrolysis be prevented from escaping from the reactor and be maintained in the sol. When titanium tetrachloride is hydrolyzed while the produced hydrogen chloride leaks out, it is difficult to make the particle size of titanium oxide particles in the sol small and the crystallinity of the titanium oxide particles obtained is poor.

It is not necessary to completely prevent hydrogen chloride produced by the hydrolysis escaping or leaking from the reactor and suppression of the escape or leakage is sufficient. The method of prevention or suppression is not limited. For example, evacuation or pressure reduction may be adopted, but the easiest and most effective method is hydrolysis in a reactor equipped with a reflux cooler. The Figure shows such a reactor. In the Figure, an aqueous solution of titanium tetrachloride 2 is charged in a reactor 1 which is equipped with a reflux cooler 3. The reactor 1 is also equipped with a stirrer 4, a thermometer 5 and a heater 6. As hydrolysis produces vapor of hydrogen chloride and water, most of the vapor is condensed by the reflux cooler and returned to the reactor, so that the hydrogen chloride hardly escapes from the reactor.

If the concentration of the titanium tetrachloride in the aqueous titanium tetrachloride solution to be hydrolyzed is too low, the productivity is low and the efficiency of forming a titanium oxide film from the obtained aqueous titanium oxide-dispersed sol is low. If the concentration of the titanium tetrachloride in the aqueous titanium tetrachloride solution to be hydrolyzed is too high, the reaction becomes vigorous so that it is difficult to make the particle size of the titanium oxide particles small and the dispersability is lowered, which is not suitable for a material for forming a transparent film. Accordingly, a method of forming a sol having a high titanium oxide concentration by hydrolysis, followed by diluting with a large amount of water to control the concentration of titanium oxide to 0.05 to 10 mol/l, is not preferred. It is desired that the concentration of titanium oxide is controlled to this range when the sol is formed. To attain this, the concentration of titanium tetrachloride in the aqueous titanium tetrachloride solution to be hydrolyzed is controlled to be almost equal to the concentration of the titanium oxide to be formed, i.e., approximately 0.05 to 10 mol/l, and if necessary, addition of a small amount of water or condensation in the following step to control the concentration of the titanium oxide to 0.05 to 10 mol/l is done.

The temperature of hydrolysis is preferably in a range of not lower than 50° C. to the boiling point of the aqueous titanium tetrachloride solution. At a temperature of lower than 50° C., a long time is necessary for the hydrolysis. After the temperature is raised to the above temperature, hydrolysis is carried out at the temperature for about 10 minutes to 12 hours. The time for maintaining a certain temperature for hydrolysis may be shorter as the temperature of hydrolysis is lower.

The hydrolysis may be conducted by heating a mixture of water and titanium tetrachloride in a reactor to the predetermined temperature, or alternatively, by previously heating water in a reactor and adding titanium tetrachloride to the heated water to raise it to the predetermined temperature.

By the above hydrolysis, titanium oxide of brookite-type or a mixture of brookite-type with anatase-type and/or rutile-type is generally obtained. To increase the content of brookite-type titanium oxide, it is appropriate that water is previously heated to 75 to 100° C., titanium tetrachioride is added to this water and hydrolysis is carried out at a temperature of from 75° C. to the boiling point of the solution. In accordance with this process, the content of brookite-type titanium oxide in the produced total titanium oxide can be increased to not less than 70% by weight.

The rate of raising the temperature is preferably not less than 0.2° C./min, more preferably not less than 0.5° C./min, since the produced titanium oxide particles become finer as the rate of raising the temperature increases.

The preparation of the aqueous titanium oxide-dispersed sol of the present invention may be conducted in a batch system or a continuous system in which titanium tetrachloride and water are continuously added to a continuous-type reactor, from the opposite end of which the reaction solution is removed and then sent to the dechlorination treatment.

In the first aqueous titanium oxide-dispersed sol of the present inventions the obtained aqueous titanium oxide-dispersed sol is then, depending on necessity, subjected to dechlorination treatment or, if acceptable, water is added or removed to control the chloride ion concentration to 50 to 10,000 ppm.

In the second aqueous titanium oxide-dispersed sol of the present invention, the obtained aqueous titanium oxide-dispersed sol may be then subjected to dechlorination treatment or, if acceptable, water is added or removed to control the chloride ion concentration to 50 to 10,000 ppm, if desired or necessary.

The dechlorination treatment may be a known process such as electrodialysis, treatment with an ion exchange resin, or electrolysis. The level of the dechlorination treatment can be detected by pH. When the chloride ion concentration is 50 to 10,000 ppm, the pH of the sol is about 5 to 0.5 and when the chloride ion concentration is in a preferred range of 100 to 4,000 ppm, the pH of the sol is about 4 to 1.

An organic solvent may be added to the aqueous titanium oxide-dispersed sol of the present invention to disperse the titanium oxide particles in a mixture of water and an organic solvent.

When a titanium oxide film is formed from the aqueous titanium oxide-dispersed sol of the present invention, it is preferred that the aqueous titanium oxide-dispersed sol is directly used to form a titanium oxide film. A process of first forming titanium oxide particles from the aqueous titanium oxide-dispersed sol, followed by dispersing the obtained titanium oxide particles in water to form a titanium oxide sol, and then using the thus obtained sol to form a titanium oxide film, is not preferred. This is because titanium oxide particles have a higher surface activity as the particles are finer, but the finer titanium oxide particles are difficult to disperse in water. That is, they become agglomerates which provides a titanium oxide film having a lowered transparency or photocatalytic activity.

EXAMPLES

The present invention is now described with reference to examples of the present invention, to which the present invention is, of course, not limited.

Examples 1 to 6

Water was added to titanium tetrachloride (purity: 99.9%) to control the concentration of titanium tetrachloride of the solution to 0.25 mol/l (reduced to titanium oxide: 2% by weight), while the aqueous solution was cooled by a cooler such as ice to prevent the temperature of the solution from exceeding 50° C. One liter of the aqueous solution was charged in a reactor equipped with a reflux cooler as shown in the Figure and heated to the boiling point (104° C.) of the solution and hydrolysis was conducted for 60 minutes by maintaining that temperature. The obtained sol was cooled and then subjected to electrodialysis to remove chloride produced in and remaining after the reaction to the chloride ion concentration as shown in Table 1. The electrodialysis was carried out using an electrodialysis device G3, manufactured by Asahi Kasei Kogyo K.K., while the pH of the sol was monitored.

Observation of the particles in the sols demonstrated that the average particle sizes of the particles were from 0.015 to 0.018 μm.

x-ray diffraction of the particles revealed that the particles were crystalline titanium oxide.

Comparative Examples 1 and 2

The procedures of Examples 1 to 6 were repeated but the chloride ion concentrations were controlled to 30 ppm (Comparative Example 1) and 15,000 ppm (Comparative Example 1).

To the thus produced aqueous titanium oxide-dispersed sols with the controlled chloride ion concentrations of Examples 1 to 6 and Comparative Examples 1 and 2, a water-soluble polymer of polyvinylalcohol as a film-forming agent was added in an amount of 1,000 ppm based on the weight of the sols. These sols with the chloride ion concentrations of 50 to 10,000 ppm were stable and did not show precipitation of titanium oxide particles even after one day (Examples 1 to 6). However, the sol with the chloride ion concentrations of 30 ppm showed agglomeration of the titanium oxide particles in the sol and the sol with the chloride ion concentrations of 15,000 ppm resulted in a titanium oxide film with a light white color.

Comparative Examples 1 and 2.

Using the sols of Examples 1 to 6 and Comparative Examples 1 and 2, titanium oxide films were formed on glass plates by dip coating a sol on a glass plate followed by drying and heat treating at 500° C. for 1 hour. The obtained titanium oxide films were 0.15 μm.

Rietveld analysis of the powder X ray diffraction patterns of the titanium oxide revealed that the titanium oxide before the heat treatment was a mixture of about 50% by weight of anatase-type titanium oxide and about 50% by weight of brookite-type titanium oxide, and the titanium oxide after the heat treatment at 800° C. or more was a single type of the rutile-type titanium oxide.

titrating potassium permanganate. The results are shown in Table 1.

The adhesivity of the film to a substrate was measured by the pencil hardness method and by the XY-matrix cut film-peeling method (JIS K5400). The peeling strength in the XY-matrix cut film-peeling method is represented by the rate of the non-peeled sections to the total cut sections.

TABLE 1

| Sample No. | Chloride ion concentration in titanium oxide sol [ppm (pH)] | Light permeability (%) | Decomposition of oxalic acid (%) | Pencil hardness | Peeling strength [non-peeledsections / total of 100 sections] |
|---|---|---|---|---|---|
| Ex. 1 | 50 (5) | 96 | 43 | H | 95 |
| Ex. 2 | 100 (4) | 96 | 44 | 2H | 100 |
| Ex. 3 | 1,000 (1.7) | 96 | 44 | 4H | 100 |
| Ex. 4 | 4,000 (1.0) | 95 | 45 | 6H | 100 |
| Ex. 5 | 7,000 (0.8) | 94 | 45 | 6H | 100 |
| Ex. 6 | 10,000 (0.7) | 90 | 45 | 6H | 100 |
| Com. Ex. 1 | 30 (5.5) | 96 | 43 | B | 70 |
| Com. Ex. 2 | 15,000 (0.5) | 55 | 42 | 6H | 95 |

Examples 7 and 8 Comparative Examples 3 and 4

The procedures as in Example 1 and Comparative Example 1 were repeated, except that the titanium oxide film was formed on a plastic substrate of polyethyleneterephtalate and the heat treatment was not conducted and the film was dried at 100° C. The evaluations were carried out in the same manner as in Examples and Comparative Examples.

The results are shown in Table 2.

TABLE 2

| Sample No. | Chloride ion concentration in titanium oxide sol [ppm (pH)] | Light permeability (%) | Decomposition of oxalic acid (%) | Pencil hardness | Peeling strength [non-peeledsections / total of 100 sections] |
|---|---|---|---|---|---|
| Ex. 7 | 100 (4) | 96 | 44 | HB | 90 |
| Ex. 8 | 4,000 (1.0) | 95 | 43 | 3H | 95 |
| Com. Ex. 3 | 30 (5.5) | 93 | 43 | HB | 70 |
| Com. Ex. 4 | 15,000 (0.5) | 55 | 42 | 3H | 83 |

Evaluation of Film

The light permeability, photocatalytic activity, and adhesive force to a quartz glass plate of a titanium oxide film obtained from each of the aqueous titanium oxide-dispersed sols of Examples and Comparative Examples, were evaluated.

The light permeability was measured for a titanium oxide film formed on a quartz glass plate by using a spectrophotometer, manufactured by Nihon Bunkoh (Japan Spectroscopy) K.K., while continuously changing the wavelength from 700 nm to 200 nm. The light permeability of the film at 550 nm was used as the light permeability of the film in the present invention. The results are shown in Table 1.

The photocatalytic activity of the titanium oxide was measured by making a reactor using a quartz glass plate coated with a titanium oxide film, charging 5 mol/l of oxalic acid in the reactor, irradiating the oxalic acid with a mercury lamp while blowing oxygen into the oxalic acid, and determining the amount of the decomposed oxalic acid by redox Example 9

954 ml of distilled water was charged in a reactor equipped with a reflex cooler as shown in FIG. 1 and heated to 95° C. While the stirring rate was kept to about 200 rpm, 46 ml of an aqueous solution of titanium tetrachloride (titanium element content: 16.3% by weight; density: 1.59; purity: 99.9%) was added dropwise into the reactor at a rate of about 5 ml/min. The temperature of the reaction solution was kept constant during the reaction. As a result, the concentration of titanium tetrachloride was changed to 0.25 mol/l (reduced titanium oxide concentration: 2% by weight).

In the reactor, the reaction solution became clouded soon after starting the addition of titanium tetrachloride, but the temperature of the reaction solution was kept constant and, after finishing the addition, raised to near the boiling point (104° C.) and kept at this temperature for 60 minutes to complete and finish the reaction. After cooling, produced and remaining chlorine was removed by electrodialysis to a pH of 2 (chloride ion: 600 ppm), followed by adding a water soluble polymer of polyvinylalcohol in an amount of 0.1% based on the weight of titanium oxide, to obtain a titanium oxide sol.

The sol was filtered and vacuum dried at 60° C. to obtain a powder, which was analyzed by X ray diffraction to reveal that the titanium oxide contained 96.7% by weight of brookite-type, 0.9% by weight of rutile-type, and 2.4% by weight of anatase-type titanium oxides.

Observation of the powder by a transmission type electromicroscope revealed that the average particle size of the primary particle was 15 nm.

The specific surface area of the powder was 100 m$^2$/g by the BET method.

The above sol was spin-coated over a quartz glass plate and dried in a drier at 100° C. to obtain a transparent film. The light permeability of the quartz glass plate with the film was over 95% in the range of the visible light, which demonstrated that the plate with the film was completely transparent. The plate with the film demonstrated an absorption in an ultraviolet region, which revealed by the absorption end of light that the energy gap was 3.75 eV. The relationship between the energy gap and the absorption end of light is shown by the following formula (1):

$$\lambda = 1239/Eg \quad (1)$$

where $\lambda$ stands for the absorption end of light in the unit of nm, and Eg stands for the energy gap in the unit of eV.

Example 10

The procedures of Example 9 were repeated but the reaction temperature during the addition of titanium tetrachloride was 75° C.

The obtained titanium oxide powder was analyzed by the X ray diffraction to reveal that it contained 75% by weight of brookite-type and 25% by weight of rutile-type titanium oxides.

Observation of the powder by a transmission type electromicroscope revealed that the average particle size of the primary particle was 10 nm.

The specific surface area of the powder was 120 m$^2$/g by the BET method.

The above sol having a pH of 1 (chloride ion: 3000 ppm), obtained by the electrodalysis, was coated over a quartz glass plate and heat treated at 500° C. to obtain a transparent film. The transparent film was also a mixture of brookite-type and rutile-type titanium oxides, as determined by the thin film X ray diffraction method. The light permeability of the quartz glass plate with the film was over 95% in the range of the visible light, which demonstrated that the plate with the film was completely transparent. The plate with the film demonstrated an absorption in a ultraviolet region, which revealed by the absorption end of light that the energy gap was 3.30 eV.

Comparative Example 5

Anatase-type titanium oxide particles having a primary particle size of 7 nm were dispersed in water with an ultrasonic wave dispersing device to an aqueous solution of titanium oxide having a concentration of titanium oxide of 2% by weight as in Example 9, during which hydrochloric acid as a coagulant was added to control the pH to 1, followed by carrying out the same procedures as in Example 9 to obtain an aqueous titanium oxide-dispersed sol. The sol was coated on a glass plate and dried at 100° C. to form a transparent film.

Comparative Example 6

An aqueous titanium oxide-dispersed sol was prepared in the same procedures as in Comparative Example 5, except that rutile-type titanium oxide particles having a primary particle size of 50 nm were used. The sol exhibited precipitation of titanium oxide particles as in Comparative Example 5 and the particles were redispersed using hydrochloric acid as a coagulant. Since a titanium oxide film formed by the supernatant after the precipitation did not show a photocatalytic activity, the sol, soon after it was prepared, was subjected to dispersing treatment with an ultrasonic dispersing device, and the obtained sol was used to form a titanium oxide film on a glass plate in the same manner as in Example 9 and the photocatalytic activity of the film was evaluated.

Evaluation of Film

The photocatalytic activities of the titanium oxide films obtained from the sols of Examples 9 to 11 and Comparative Example 5 and 6 were evaluated by the oxalic acid decomposition method. The results are shown in Table 3.

TABLE 3

|  | Rate of decomposition (%) (after 4 hours irradiation) |
| --- | --- |
| Example 9 | 55 |
| Example 10 | 48 |
| Example 11 | 50 |
| Comparative Example 5 | 30 |
| Comparative Example 6 | not determined since the substrate was clouded |

In Comparative Example 5, the surface of the glass substrate was not uniform as agglomerates of titanium oxide were formed.

In Comparative Example 6, the photocatalytic activities of the titanium oxide film was not determined since a transparent titanium oxide film was not obtained.

Example 12

In the same manner as in Example 9, 0.25 mol/1 (reduced to titanium oxide: 2% by weight) of an aqueous titanium tetrachloride solution was subjected to hydrolysis. The resultant reaction solution was condensed to a titanium oxide concentration of 10% by weight, electrodialysis was carried out to remove the remaining chlorine to a pH of 2 (chloride ion concentration of about 600 ppm), and tetramethylorthosilicate Si(OCH$_3$)$_4$ as an adhesive was added to the sol in an amount as SiO$_2$ of 5% by weight, to obtain a titanium oxide sol.

Example 13

The procedures up to the condensation and electrodialysis in the procedures in Example 12 were repeated, followed by diluting with isopropylalcohol to 5 times and adding tetraethylorthosilicate Si(OC$_2$H$_5$)$_4$ as an adhesive in an amount, as SiO$_2$, of 20% by weight, to obtain a titanium oxide sol.

Example 14

The procedures of Example 12 were repeated but tetrapropylorthosilicate Si(OC$_3$H$_7$)$_4$ was substituted for tetramethylorthosilicate and added in an amount, as SiO$_2$, of 35% by weight, to obtain a titanium oxide sol.

Comparative Example 7

The procedures of Example 14 were repeated but tetrapropylorthoslicate was added in an amount, as SiO$_2$, of 55% by weight, to obtain a titanium oxide sol.

Evaluation of Film

Each of the sols obtained in Examples 12 to 14 and Comparative Example 7 was spin-coated over a quartz glass plate and allowed to stand for drying to obtain a transparent film. The light permeabilities of the quartz glass plates with the film were over 95% in the range of the visible light, which demonstrated that the plates with the films were completely transparent.

The pencil hardness test and the adhesion test were made on the quartz glass plates with the titanium oxide films. The results are shown in Table 4.

TABLE 4

| Sample No. | Silicon oxide/ titanium oxide ratio (% by weight) | Decomposition of oxalic acid (%) | Pencil hardness (%) | Peeling strength [non-peeled sections / total of 100 sections] |
|---|---|---|---|---|
| Ex. 12 | 5 | 50 | 5H | 100 |
| Ex. 13 | 20 | 50 | 5H | 100 |
| Ex. 14 | 35 | 40 | 6H | 100 |
| Com. Ex. 7 | 55 | 0 | 7H | 100 |

What is claimed is:

1. Particles consisting of titanium dioxide particles comprising brookite crystalline phase in an amount of 70% by weight or more based upon the total weight of the titanium dioxide particles, said titanium dioxide particles having an average particle size of not more than 0.5 μm and a specific surface area of not less than 20 m$^2$/g.

2. The particles according to claim 1, wherein said titanium dioxide has an energy gap of not less than 3.23 eV.

3. Titanium dioxide particles, wherein said titanium dioxide particles comprise brookite crystalline phase in an amount of 70% by weight or more based upon the total weight of the titanium dioxide particles, said titanium dioxide particles having an average particle size of not more than 0.5 μm and a specific surface area of not less than 20 m$^2$/g, and said titanium dioxide particles are produced through a process for preparing an aqueous titanium oxide-dispersed sol, comprising the steps of: forming an aqueous titanium oxide-dispersed sol by hydrolysis of titanium tetrachloride, controlling an amount of chloride ions in said aqueous titanium oxide-dispersed sol to 50 to 10,000 ppm by weight as the chlorine element, and filtering and drying the aqueous titanium oxide-dispersed sol to produce said titanium dioxide particles.

4. The titanium dioxide particles according to claim 3, wherein said titanium dioxide has an energy gap of not less than 3.23 eV.

5. Titanium dioxide particles, wherein said titanium dioxide particles comprise brookite crystalline phase in an amount of 70% by weight or more based upon the total weight of the titanium dioxide particles, said titanium dioxide particles having an average size of not more than 0.5 μm and a specific surface area of not less than 20 m$^2$/g, and said titanium dioxide particles are produced through a process for preparing an aqueous titanium dioxide-dispersed sol, comprising the steps of: adding titanium tetrachloride to hot water at a temperature of 75 to 100° C., and hydrolyzing the titanium tetrachloride at a temperature in a range of 75° C. to a boiling point of the mixture, to form an aqueous sol of said titanium dioxide particles, filtering and drying the aqueous sol of said titanium dioxide particles to produce said titanium dioxide particles.

* * * * *